United States Patent
Uchigata et al.

(10) Patent No.: US 10,737,427 B2
(45) Date of Patent: *Aug. 11, 2020

(54) LONG FIBER-REINFORCED POLYARYLENE SULFIDE RESIN MOLDED ARTICLE AND METHOD FOR PRODUCING THE SAME

(71) Applicant: DIC Corporation, Tokyo (JP)

(72) Inventors: Masanori Uchigata, Ichihara (JP); Yukihiko Yudate, Ichihara (JP); Koji Tanaka, Ichihara (JP); Taku Shimaya, Ichihara (JP)

(73) Assignee: DIC Corporation, Tokyo (JP)

( * ) Notice: Subject to any disclaimer, the term of this patent is extended or adjusted under 35 U.S.C. 154(b) by 196 days.

This patent is subject to a terminal disclaimer.

(21) Appl. No.: 15/557,602

(22) PCT Filed: Mar. 22, 2016

(86) PCT No.: PCT/JP2016/058961
§ 371 (c)(1),
(2) Date: Sep. 12, 2017

(87) PCT Pub. No.: WO2016/152845
PCT Pub. Date: Sep. 29, 2016

(65) Prior Publication Data
US 2018/0043602 A1    Feb. 15, 2018

(30) Foreign Application Priority Data

Mar. 26, 2015  (JP) ................ 2015-064396
Apr. 24, 2015  (JP) ................ 2015-089436

(51) Int. Cl.
| B29C 49/00 | (2006.01) |
| C08L 81/02 | (2006.01) |
| B29B 7/74 | (2006.01) |
| C08J 5/04 | (2006.01) |
| B29B 7/30 | (2006.01) |
| B29B 13/02 | (2006.01) |
| C08L 101/02 | (2006.01) |
| C08L 63/00 | (2006.01) |
| B29B 7/02 | (2006.01) |
| B29B 7/90 | (2006.01) |
| B29B 7/00 | (2006.01) |
| B29B 13/04 | (2006.01) |
| B29B 15/10 | (2006.01) |
| B29L 31/00 | (2006.01) |
| B29K 63/00 | (2006.01) |
| B29K 105/08 | (2006.01) |
| B29L 31/30 | (2006.01) |
| B29L 23/00 | (2006.01) |
| B29C 49/04 | (2006.01) |

(Continued)

(52) U.S. Cl.
CPC .......... *B29C 49/0005* (2013.01); *B29B 7/002* (2013.01); *B29B 7/02* (2013.01); *B29B 7/30* (2013.01); *B29B 7/7461* (2013.01); *B29B 7/90* (2013.01); *B29B 13/02* (2013.01); *B29B 13/04* (2013.01); *B29B 15/105* (2013.01); *C08J 5/04* (2013.01); *C08L 63/00* (2013.01); *C08L 81/02* (2013.01); *C08L 101/02* (2013.01); B29B 9/06 (2013.01); B29C 49/04 (2013.01); B29K 2063/00 (2013.01); B29K 2081/04 (2013.01); B29K 2105/0088 (2013.01); B29K 2105/08 (2013.01); B29K 2105/12 (2013.01); B29K 2309/08 (2013.01); B29K 2995/0016 (2013.01); B29L 2022/00 (2013.01); B29L 2023/22 (2013.01); B29L 2031/3055 (2013.01); B29L 2031/749 (2013.01); C08J 2381/04 (2013.01)

(58) Field of Classification Search
None
See application file for complete search history.

(56) References Cited

U.S. PATENT DOCUMENTS

| 6,037,422 A | 3/2000 | Yamao et al. |
| 2004/0152823 A1 | 8/2004 | Suga |

(Continued)

FOREIGN PATENT DOCUMENTS

| EP | 0 358 135 A2 | 3/1990 |
| EP | 3 064 535 A1 | 9/2016 |

(Continued)

OTHER PUBLICATIONS

International Search Report dated Jun. 21, 2016, issued for PCT/JP2016/058961.

*Primary Examiner* — Monica A Huson
(74) *Attorney, Agent, or Firm* — Locke Lord LLP

(57) ABSTRACT

To provide a polyarylene sulfide (PAS) resin composition and a PAS resin molded article that are excellent in mechanical strengths such as impact resistance while maintaining excellent heat resistance of the PAS resin, and methods for producing the PAS resin composition and the PAS resin molded article. Specifically, provided are a method for producing a long fiber-reinforced PAS resin molded article, the method including obtaining a long fiber-reinforced PAS resin composition containing a PAS resin and a fiber reinforcing material having a fiber length of more than 5 mm, subsequently subjecting the resin composition and a PAS resin to dry blending, and subsequently subjecting the dry-blended substance to melting and subsequently to melt-molding; the long fiber-reinforced PAS resin composition; and a method for producing the long fiber-reinforced PAS resin composition.

16 Claims, No Drawings

(51) Int. Cl.
    *B29B 9/06* (2006.01)
    *B29K 81/00* (2006.01)
    *B29K 105/00* (2006.01)
    *B29K 105/12* (2006.01)
    *B29K 309/08* (2006.01)
    *B29L 22/00* (2006.01)

(56) References Cited

U.S. PATENT DOCUMENTS

2006/0068141 A1   3/2006   Tsutsumi et al.
2013/0059976 A1   3/2013   Matsuo et al.

FOREIGN PATENT DOCUMENTS

| EP | 3 085 515 A1 | | 10/2016 |
|---|---|---|---|
| JP | 03-236930 A | | 10/1991 |
| JP | 03-281661 A | | 12/1991 |
| JP | 04-209657 A | | 7/1992 |
| JP | 2003-171551 A | | 6/2003 |
| JP | 2006-124647 A | | 5/2006 |
| JP | 2007-197625 A | | 8/2007 |
| JP | 2007-217679 A | | 8/2007 |
| JP | 2009-74043 A | | 4/2009 |
| JP | 2009074043 A | * | 4/2009 |
| WO | 2011/148929 A1 | | 12/2011 |

* cited by examiner

LONG FIBER-REINFORCED POLYARYLENE SULFIDE RESIN MOLDED ARTICLE AND METHOD FOR PRODUCING THE SAME

TECHNICAL FIELD

The present invention relates to a long fiber-reinforced polyarylene sulfide resin composition, its molded article, and methods for producing the resin composition and the molded article, in particular, to a blow-molded hollow article and a method for producing the molded article.

BACKGROUND ART

With the recent trend toward a decrease in the fuel consumption of automobiles for the purpose of saving of resources, energy conservation, and a decrease in emission of carbon dioxide, there has particularly been a demand for a decrease in the weight of automobile parts.

Conventionally, in order to decrease the weight of various materials formed of metal, the metal has been replaced by resin materials having a lower specific gravity than the metal, in particular, polyamide-based materials. However, polyamide-based materials have lower heat resistance, compared with metal materials. For this reason, polyamide-based materials are limited for their usage. Thus, there has been a demand for a resin material having higher heat resistance.

In particular, regarding automobile parts that are ducts within engine rooms, conventional aluminum materials have been replaced by blow-molded hollow articles formed of resin materials. Currently, polyamide-based materials are mainly used. However, since the members are mainly exposed to exhaust gas, polyamide-based materials are insufficient in terms of heat resistance. For this reason, there has been a demand for a blow hollow molding material that has high heat resistance and also has chemical resistance and impact resistance.

Thus, use of an engineering plastic excellent in terms of heat resistance, chemical resistance, flame resistance, electrical characteristics, and the like, a polyarylene sulfide resin (hereafter, sometimes abbreviated as a PAS resin), has been studied not only for automobile parts but also for various applications including electrical or electronic components and precision machinery components. However, molded articles formed of the polyarylene sulfide resin are known to be brittle. Although such molded articles are provided so as to have impact resistance by addition of various fillers, they are still insufficient as replacements for metal materials.

In particular, various attempts have been made for a long time for use of blow hollow molding materials using a polyarylene sulfide resin. However, when molding a polyarylene sulfide resin, it has extremely high melt fluidity, and thus in normal extrusion blow molding, that is, in a method of extruding and blow-molding a parison, there is a problem in that draw-down of the parison extremely increases, and it is very difficult to mold the parison into a container having small thickness unevenness. Accordingly, the use of the polyarylene sulfide resin is mostly limited to an injection molding method, and most of the molded articles of the polyarylene sulfide resin have small sizes. The application of the polyarylene sulfide resin to large-sized components such as bottles and tanks provided by blow molding or the like has been rarely performed.

As an example of the application of the polyarylene sulfide resin to blow molding, there is a known resin composition obtained by melting and kneading a polyarylene sulfide resin and an epoxy group-containing olefin-based copolymer (PTL 1). However, although the polyarylene sulfide resin has a high melt viscosity, it has a high proportion of terminal carboxy groups, and contains a large amount of low-molecular-weight components. For this reason, there is room to improve moldability of the composition in terms of draw-down resistance and thickness unevenness in performing the blow hollow molding. In addition, there is also room to improve the mechanical strengths, particularly, thermal shock resistance particularly because of a high proportion of the reaction products between the low-molecular-weight components of the polyarylene sulfide resin and the epoxy group-containing olefin-based copolymer. Thus, the composition has not yet been used under more harsh environments such as in regions including automobile engines.

There is a known blow-molded hollow article excellent in moldability and mechanical strengths such as thermal shock resistance, which is provided by the combination of a high-molecular-weight linear polyarylene sulfide resin having a specified concentration of terminal carboxy groups and an olefin-based polymer (PTL 2). However, while use of the olefin-based polymer can impart mechanical strengths such as impact resistance to blow-molded hollow articles containing the polyarylene sulfide resin, it also causes degradation of the heat resistance. For this reason, there has been a demand for a blow-molded hollow article that is excellent in mechanical strengths such as impact resistance while maintaining excellent heat resistance of a polyarylene sulfide resin.

CITATION LIST

Patent Literature

PTL 1: Japanese Unexamined Patent Application Publication No. 3-236930
PTL 2: WO2011/148929 Pamphlet

SUMMARY OF INVENTION

Technical Problem

Accordingly, an object of the present invention is to provide a polyarylene sulfide resin molded article that is excellent in mechanical strengths such as impact resistance while maintaining excellent heat resistance of the polyarylene sulfide resin; a polyarylene sulfide resin composition for providing the molded article; and methods for producing the molded article and the resin composition. Another object is to provide, particularly among molded articles, a blow-molded hollow article that is excellent in mechanical strengths such as impact resistance and is also excellent in moldability in terms of draw-down resistance, thickness unevenness, and inner-surface smoothness; a polyarylene sulfide resin composition for providing the molded article; and methods for producing the molded article and the resin composition.

Solution to Problem

The inventors of the present invention have conducted intensive studies to solve the above-described problems, and as a result, have found that it is possible to provide a long fiber-reinforced polyarylene sulfide resin molded article that is excellent in mechanical strengths such as impact resistance by subjecting a long fiber-reinforced polyarylene sulfide resin composition containing a polyarylene sulfide resin and a fiber reinforcing material having a fiber length of more than 5 mm, and a polyarylene sulfide resin to dry blending, and by subsequently melting and then molding the dry-blended substance. Thus, the inventors have completed the present invention.

Specifically, the present invention relates to a method for producing a long fiber-reinforced polyarylene sulfide resin molded article, the method being a method for producing a blow-molded hollow article containing a polyarylene sulfide resin and a fiber reinforcing material having a fiber length of more than 5 mm, the method including subjecting a long fiber-reinforced polyarylene sulfide resin composition containing a polyarylene sulfide resin (a1) and a fiber reinforcing material having a fiber length of more than 5 mm and a polyarylene sulfide resin (a2) to dry blending, subsequently to heating at a temperature not lower than a melting point of the polyarylene sulfide resins to melt the polyarylene sulfide resins, and subsequently to molding.

The present invention also relates to a long fiber-reinforced polyarylene sulfide resin molded article including a polyarylene sulfide resin and a fiber reinforcing material having a fiber length of more than 5 mm, wherein a MFR measured with a melt indexer at a cylinder temperature of 316° C. with an orifice diameter of 3 mm is 10 to 100 [g/10 min], and a proportion of the polyarylene sulfide resin is 99 to 25 parts by mass, and a proportion of the fiber reinforcing material is 1 to 75 parts by mass, with respect to the total 100 parts by mass of the polyarylene sulfide resin and the fiber reinforcing material.

Advantageous Effects of Invention

According to the present invention, it is possible to provide a polyarylene sulfide resin molded article that is excellent in mechanical strengths such as impact resistance while maintaining excellent heat resistance of the polyarylene sulfide resin; a polyarylene sulfide resin composition for providing the molded article; and methods for producing the molded article and the resin composition. It is also possible to provide, particularly among molded articles, a blow-molded hollow article that is excellent in mechanical strengths such as impact resistance and is also excellent in moldability in terms of draw-down resistance, thickness unevenness, and inner-surface smoothness; a polyarylene sulfide resin composition for providing the molded article; and methods for producing the molded article and the resin composition.

DESCRIPTION OF EMBODIMENTS

A method for producing a long fiber-reinforced polyarylene sulfide resin molded article according to the present invention is a method for producing a long fiber-reinforced polyarylene sulfide resin molded article containing a polyarylene sulfide resin and a fiber reinforcing material having a fiber length of more than 5 mm, the method including subjecting a long fiber-reinforced polyarylene sulfide resin composition containing a polyarylene sulfide resin (a) and a fiber reinforcing material having a fiber length of more than 5 mm and a polyarylene sulfide resin (b) to dry blending, subsequently to heating at a temperature not lower than a melting point of the polyarylene sulfide resins to melt the polyarylene sulfide resins, and subsequently to molding.

A long fiber-reinforced polyarylene sulfide resin composition used in the present invention will be described.

A polyarylene sulfide resin used in the present invention has a resin structure having, as a repeating unit, a structure formed by bonding an aromatic ring and a sulfur atom. Specifically, the polyarylene sulfide resin is a resin having, as repeating units, a structure part represented by the following Formula (1)

[Chem. 1]

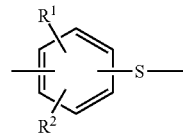

Formula (1)

(in the formula, $R^1$ and $R^2$ are each independently a hydrogen atom, an alkyl group having 1 to 4 carbon atoms, a nitro group, an amino group, a phenyl group, a methoxy group, or an ethoxy group), and optionally a trifunctional structure part represented by the following Formula (2).

[Chem. 2]

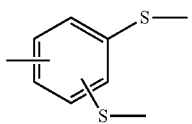

Formula (2)

The amount of the trifunctional structure part represented by the following Formula (8) is preferably 0.001 to 3 mol %, and particularly preferably 0.01 to 1 mol % with respect to the total number of moles of the trifunctional structure part and the other structure parts.

Here, in the structure part represented by the above Formula (1), in particular, $R^1$ and $R^2$ in the formula are preferably hydrogen atoms in view of the mechanical strength of the polyarylene sulfide resin (A). In that case, examples of the structure part include a structure part formed by bonding at a para position represented by the following Formula (3) and a structure part formed by bonding at a meta position represented by the following Formula (4).

[Chem. 3]

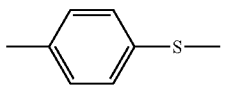

Formula (3)

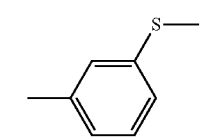

Formula (4)

Of these, particularly, in the repeating unit, regarding the bonding of the sulfur atom to the aromatic ring, preferred is a structure formed by bonding at the para position represented by the above structural Formula (3) in view of the heat resistance and the crystallinity of the polyarylene sulfide resin.

The polyarylene sulfide resin may include, not only the structure parts represented by the above Formulae (1) and (2), but also structure parts represented by the following Structural Formulae (5) to (8) such that the amounts of the structure parts represented by Structural Formulae (5) to (8) are not more than 30 mol % of the total amount of the structure parts represented by the above Formulae (1) and (2).

[Chem. 4]

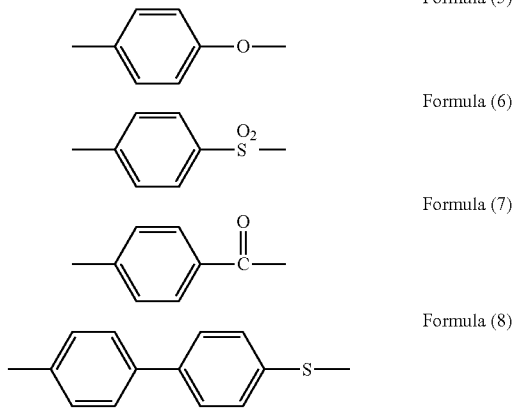

Formula (5)

Formula (6)

Formula (7)

Formula (8)

Particularly, in the present invention, the amounts of the structure parts represented by the above Formulae (5) to (8) are preferably 10 mol % or less in view of the heat resistance and the mechanical strength of the polyarylene sulfide resin. When the polyarylene sulfide resin includes structure parts represented by the above Formulae (5) to (8), the bonding form thereof may form a random copolymer or a block copolymer.

The polyarylene sulfide resin may have, in its molecular structure, a naphthyl sulfide bond, for example. The amount of the naphthyl sulfide bond is preferably not more than 3 mol %, and particularly preferably not more than 1 mol %, with respect to the total number of moles of the naphthyl sulfide bond and the other structure parts.

The method for producing the polyarylene sulfide resin is not particularly limited. However, examples thereof include 1) a method of polymerizing a dihalogeno aromatic compound, if necessary, with the addition of a polyhalogeno aromatic compound or other copolymerization components, in the presence of sulfur and sodium carbonate, 2) a method of polymerizing a dihalogeno aromatic compound, if necessary, with the addition of a polyhalogeno aromatic compound or other copolymerization components, in the presence of a sulfidizing agent or the like in a polar solvent, and 3) a method of self-condensing p-chlorothiophenol, if necessary, with the addition of other copolymerization components. Among these methods, the method described in 2) is versatile and preferred. During the reaction, an alkali metal salt of a carboxylic acid or a sulfonic acid, or an alkali hydroxide may be added in order to adjust the degree of polymerization. Particularly preferred are polyarylene sulfide resins obtained by, of such methods described in 2), a method of producing a polyarylene sulfide resin, the method including introducing an aqueous sulfidizing agent into a heated mixture containing an organic polar solvent and a dihalogeno aromatic compound at a rate at which water can be removed from the reaction mixture to react the dihalogeno aromatic compound with the sulfidizing agent in the organic polar solvent, if necessary, with the addition of a polyhalogeno aromatic compound, and controlling the water content in the reaction system to be in a range of 0.02 to 0.5 moles with respect to 1 mole of the organic polar solvent (refer to Japanese Unexamined Patent Application Publication No. 07-228699); or by a method of reacting, in the presence of a solid alkali metal sulfide and an aprotic polar organic solvent, a dihalogeno aromatic compound, (if necessary, with the addition of a polyhalogeno aromatic compound or other copolymerization components,) an alkali metal hydrosulfide, and an organic acid alkali metal salt, wherein the amount of the organic acid alkali metal salt is 0.01 to 0.9 moles with respect to 1 mole of the sulfur source and the water content in the reaction system is controlled to be 0.02 moles or less with respect to 1 mole of the aprotic polar organic solvent (refer to WO2010/058713 Pamphlet). Specific examples of the dihalogeno aromatic compound include p-dihalobenzene, m-dihalobenzene, o-dihalobenzene, 2,5-dihalotoluene, 1,4-dihalonaphthalene, 1-methoxy-2,5-dihalobenzene, 4,4'-dihalobiphenyl, 3,5-dihalobenzoic acid, 2,4-dihalobenzoic acid, 2,5-dihalonitrobenzene, 2,4-dihalonitrobenzene, 2,4-dihaloanisole, p,p'-dihalodiphenyl ether, 4,4'-dihalobenzophenone, 4,4'-dihalodiphenylsulfone, 4,4'-dihalodiphenyl sulfoxide, 4,4'-dihalodiphenyl sulfide, and a compound having an alkyl group having 1 to 18 carbon atoms on the aromatic ring of each of the above compounds. Examples of the polyhalogeno aromatic compound include 1,2,3-trihalobenzene, 1,2,4-trihalobenzene, 1,3,5-trihalobenzene, 1,2,3,5-tetrahalobenzene, 1,2,4,5-tetrahalobenzene, and 1,4,6-trihalonaphthalene. The halogen atoms contained in the above compounds are desirably chlorine atoms or bromine atoms.

The method of post-treating the reaction mixture containing the polyarylene sulfide resin obtained by the polymerization process is not particularly limited. However, examples thereof include (1) a method including: after the completion of the polymerization reaction, distilling away the solvent from the reaction mixture under reduced pressure or ordinary pressure after addition or no addition of an acid or a base, and subjecting the solids after the distillation of the solvent to rinsing with a solvent one or more times, such as water, a reaction solvent (or an organic solvent having a capability of dissolving low-molecular polymers, the capability being equivalent to that of the reaction solvent), acetone, methyl ethyl ketone, or an alcohol, and further to neutralization, rinsing with water, filtering, and drying; (2) a method including: after the completion of the polymerization reaction, adding to the reaction mixture, as a precipitation agent, a solvent (which is soluble in the polymerization solvent having been used, and also serves as a poor solvent at least for the polyarylene sulfide) such as water, acetone, methyl ethyl ketone, an alcohol, an ether, halogenated hydrocarbon, aromatic hydrocarbon, or aliphatic hydrocarbon to precipitate solid products of the polyarylene sulfide, inorganic salts, and the like, and subjecting the solid products to filtering, rinsing, and drying; (3) a method including: after the completion of the polymerization reaction, adding to the reaction mixture a reaction solvent (or an organic solvent having a capability of dissolving low-molecular polymers, the capability being equivalent to that of the reaction solvent), subjecting the reaction mixture to stirring, subsequently to filtering to remove low-molecular-weight polymers, subsequently to rinsing one or more times with a solvent such as water, acetone, methyl ethyl ketone, or an alcohol, subsequently to neutralization, rising with water, filtering, and drying; (4) a method including: after the completion of the polymerization reaction, adding water to the reaction mixture to subject the reaction mixture to rinsing with water and filtering, to an acid treatment with an acid added during the rinsing with water as necessary, and to drying; and (5) a method including: after the completion of the polymerization reaction, subjecting the reaction mixture to filtering, rinsing with a reaction solvent one or more times as necessary, further to rinsing with water, filtering, and drying.

Incidentally, in the post-treatment methods exemplified in (1) to (5) above, the polyarylene sulfide resin may be dried in vacuum, air, or an inert gas atmosphere such as nitrogen.

The melt viscosity of the polyarylene sulfide resin is not particularly limited as long as it is in a suitable range for blow molding. However, the melt viscosity at a temperature of 300° C. and a shear rate of 10 sec$^{-1}$ is preferably 10 to 500 Pa·s, more preferably 25 to 300 Pa·s, and still more preferably 45 to 200 Pa·s. When the melt viscosity is 10 Pa·s or higher, draw-down is less likely to occur. On the other hand, when the melt viscosity is 500 Pa·s or lower, the stability in extruding a parison is good, and a uniform molded article without thickness unevenness is likely to be obtained.

The non-Newtonian index of the polyarylene sulfide resin is not particularly limited as long as it is in a suitable range for blow molding. However, the non-Newtonian index is preferably 0.9 to 1.2.

In summary, regarding a polyarylene sulfide resin used in the present invention, when the polyarylene sulfide resin itself has a high melt viscosity suitable for blow hollow molding and also has, among linear structures, a straight-chain structure that has a low branching degree in which the non-Newtonian index is 0.9 to 1.2, it is possible to prevent an excessive increase in the melt viscosity of the melted and kneaded material due to reaction with the fiber reinforcing material, to thereby exhibit excellent moldability without thickness unevenness. Thus, improvements tend to be achieved in mechanical strengths of a blow-molded hollow article, in particular, impact resistance.

Incidentally, in a method for producing a long fiber-reinforced polyarylene sulfide resin molded article according to the present invention, the polyarylene sulfide resin (sometimes referred to as the "polyarylene sulfide resin (a1)") contained in the long fiber-reinforced polyarylene sulfide resin composition, and the polyarylene sulfide resin (sometimes referred to as the "polyarylene sulfide resin (a2)") to be dry-blended with the long fiber-reinforced polyarylene sulfide resin composition may be the same or different as long as these resins fall within the above-described definitions of polyarylene sulfide resin.

As a fiber reinforcing material used in the present invention, a known inorganic fiber reinforcing material or a known organic fiber reinforcing material can be used. Examples thereof include glass fiber reinforcing materials, metal fiber reinforcing materials, basalt fiber reinforcing materials, carbon fiber reinforcing materials, aramid fiber (wholly aromatic polyamide fiber) reinforcing materials, nylon MXD6 fiber (fiber formed of copolycondensation polymer of m-xylylenediamine and adipic acid) reinforcing materials, PET fiber reinforcing materials, PBT fiber reinforcing materials, and wholly aromatic polyester fiber (Kevlar fiber) reinforcing materials.

These fiber reinforcing materials can be used not only in the form of a monofilament, but also in the form of a roving in which a large number of monofilaments are bundled with a sizing agent. The roving is preferably a roving that is a bundle of 500 to 60,000 monofilaments having an average fiber diameter of 5 to 50 μm, preferably an average fiber diameter of 6 to 30 μm, and more preferably a roving that is a bundle of 1,000 to 20,000 monofilaments having an average fiber diameter of 9 to 24 μm. Such rovings can also be used in the form of multiple wound yarn of two or more rovings. Such rovings themselves twisted can also be used. Examples of the sizing agent include sizing agents containing one or more kinds selected from maleic anhydride-based compounds, urethane-based compounds, acrylic compounds, epoxy-based compounds, and copolymers of the foregoing compounds; and preferred examples of the sizing agents include those containing an epoxy-based compound or a urethane-based compound. Among these, preferred examples are epoxy-based compounds and urethane-based compounds, and more preferred examples are epoxy-based compounds. Examples of the epoxy-based compounds include bisphenol-epichlorohydrin-type epoxy resins, glycidyl ether-type epoxy resins, tetraepoxy resins, novolac-type epoxy resins, glycidylamine, epoxy alkyl esters, and epoxidized unsaturated compounds. Examples of the urethane-based compounds include compounds synthesized from an isocyanate such as m-xylylene diisocyanate (XDI), 4,4'-methylenebis(cyclohexyl isocyanate) (HMDI), or isophorone diisocyanate (IPDI), and a polyester- or polyether-based diol.

In the present invention, a thermoplastic elastomer can be optionally used. The thermoplastic elastomer that can be optionally used is preferably a thermoplastic elastomer having at least one functional group selected from the group consisting of an epoxy group, an amino group, a carboxy group, an isocyanato group, and moieties represented by a structural formula (1) or a structural formula (2) below

[Chem. 5]

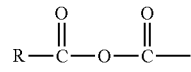

Structural formula (1)

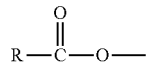

Structural formula (2)

(where, in the structural formula (1) and the structural formula (2), R's represent an alkyl group having 1 to 8 carbon atoms). These groups and moieties are functional groups that are highly miscible with carboxy groups or functional groups that are reactive to carboxy groups. Thus, when the elastomer is melted and kneaded with a polyarylene sulfide resin having a carboxy group, the elastomer and the resin sufficiently dissolve in or react with each other. As a result, a molded article according to the present invention can have mechanical strengths, in particular, excellent bending strength, high impact resistance, and a high modulus of elasticity in bending, which is preferable.

The thermoplastic elastomer is preferably, for example, a polyolefin obtained by copolymerizing an α-olefin and a monomer such as a vinyl polymerizable compound that may have the above-described functional group. Examples of the α-olefin include α-olefins having 2 to 8 carbon atoms such as ethylene, propylene, and butene-1. Examples of the vinyl polymerizable compound that may have the above-described functional group include α,β-unsaturated carboxylic acids and alkyl esters thereof such as (meth)acrylic acid and (meth)acrylate; and α,β-unsaturated dicarboxylic acids and derivatives thereof such as unsaturated dicarboxylic acids having 4 to 10 carbon atoms such as maleic acid, fumaric acid, and itaconic acid, mono- or di-esters of the foregoing, and acid anhydrides of the foregoing.

More specifically, for example, the polyolefin having an epoxy group is not particularly limited as long as it is an olefin-based polymer having an epoxy group; however, the polyolefin is preferably a copolymer of an α-olefin and a glycidyl ester of an α,β-unsaturated acid. Examples of the α-olefin include ethylene, propylene, and butene-1. Specific examples of the glycidyl ester of an α,β-unsaturated acid include glycidyl acrylate, glycidyl methacrylate, and glycidyl ethacrylate. The modification ratio of the monomer components to the α-olefin is not particularly limited; however, the modification ratio represented as a ratio of the mass of the monomers having the modified portions in the copolymer to 100 mass of the copolymer, is preferably 0.1 to 15 parts by mass, in particular, preferably 0.5 to 10 parts by mass.

The polyolefin having an amino group or an isocyanato group can be obtained by, for example, causing a polyamine or a polyisocyanate such as an alkylene diamine or an alkylene diisocyanate to react with the above-described polyolefin modified with a carboxylic acid. Examples of the alkylene diamine and the alkylene diamine include ethylenediamine, pentamethylenediamine, hexamethylenediamine, ethylene diisocyanate, pentamethylene diisocyanate, and hexamethylene diisocyanate.

An olefin-based polymer that does not have a functional group reactive to a carboxy group, what is called, an unmodified olefin-based polymer can also be used. Examples thereof include homopolymers such as polyethylene, polypropylene, polystyrene, polyacrylate, polymethacrylate, poly-1-butene, poly-1-pentene, and polymethylpentene; and ethylene-α-olefin copolymers. Of these, the ethylene-α-olefin copolymers are preferred.

Such an ethylene-α-olefin copolymer is a copolymer that has, as constitutional components, ethylene and at least one α-olefin having 3 to 20 carbon atoms. Specific examples of the α-olefin having 3 to 20 carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene, and combinations of the foregoing. Of these α-olefins, α-olefins having 6 to 12 carbon atoms are more preferably used because the resultant copolymer has enhanced mechanical strength and further enhanced modification effects.

When a polyolefin that does not have a functional group, what is called, an unmodified polyolefin is used, its melt viscosity is not particularly limited; however, the melt viscosity measured as a melt flow rate (temperature: 190° C., load: 2.16 kg) is preferably 0.01 to 70 poises.

Incidentally, the olefin-based polymer may be obtained by copolymerization with, for example, another olefin-based monomer such as methyl acrylate, methyl methacrylate, acrylonitrile, styrene, vinyl acetate, or vinyl ether as long as advantageous effects provided by the present invention are not impaired.

A thermoplastic elastomer that can be used in the present invention is preferably an elastomer that can be melted and dispersed by mixing at a kneading temperature for the polyarylene sulfide resin. In view of this, an elastomer is more preferred that has a melting point of 300° C. or less and has rubber elasticity at room temperature. In particular, in the case of considering heat resistance, ease of mixing, and enhancement of freezing resistance, an elastomer having a glass transition temperature of −30° C. or less is preferred because it has rubber elasticity even at very low temperatures. The lower the glass transition temperature, the more preferable it is from the viewpoint of enhancing freezing resistance. However, in general, the glass transition temperature is preferably −180° C. to −30° C., particularly preferably −150° C. to −30° C.

The above-described polyolefins having a functional group having high miscibility with a carboxy group or a functional group reactive to a carboxy group, and the above-described polyolefins not having the functional groups, what is called, unmodified polyolefins can be used alone or in combination of two or more thereof.

Incidentally, in a method for producing a long fiber-reinforced polyarylene sulfide resin molded article according to the present invention, to the long fiber-reinforced polyarylene sulfide resin composition, the thermoplastic elastomer (sometimes referred to as the "thermoplastic elastomer (b1)") may be added; and/or, as a component dry-blended with the long fiber-reinforced polyarylene sulfide resin composition, the thermoplastic elastomer (sometimes referred to as the "thermoplastic elastomer (b2)") may be further added to the polyarylene sulfide resin (a2).

A long fiber-reinforced polyarylene sulfide resin composition used in the present invention contains a polyarylene sulfide resin and a fiber reinforcing material having a fiber length of more than 5 mm. The long fiber-reinforced polyarylene sulfide resin composition can be produced on the basis of methods such as the method described in Japanese Unexamined Patent Application Publication No. 2003-192911. For example, a strand obtained by coating or impregnating a continuous fiber (monofilament or roving) with a melted polyarylene sulfide resin and then cooling the resulting continuous fiber, is cut to a length of more than 5 mm, and thus the long fiber-reinforced polyarylene sulfide resin composition can be obtained. In this case, to the melted polyarylene sulfide resin, for example, the thermoplastic elastomer, a processing stabilizer, an oxidation stabilizer, a molding aid, or other additives may be added as necessary.

In the course of preparing a long fiber-reinforced polyarylene sulfide resin composition according to the present invention, a polyarylene sulfide resin serving as a base resin is put after, as necessary, blending with, for example, the thermoplastic elastomer, a processing stabilizer, an oxidation stabilizer, a molding aid, filler, or other additives, into a single- or twin-screw extruder having a heating mechanism, and then melted and kneaded at a temperature not lower than the melting point of the polyarylene sulfide resin, preferably at a temperature not lower than the melting point+10° C., more preferably at a temperature in a range of the melting point+10° C. to the melting point+100° C., and still more preferably at a temperature in a range of the melting point+20° C. to the melting point+50° C., to shift into a flowable state. After that, the resulting material is charged into an impregnation apparatus (impregnation die) at a predetermined speed.

As the impregnation apparatus, an opening impregnation apparatus is used in a case where the continuous fiber is a roving. The opening impregnation apparatus includes a melted resin storing portion, a fiber guide hole (inlet) formed in the upstream-side boundary wall or the upstream-side top board, and a shaping nozzle formed in the downstream-side boundary wall. In the apparatus, two or more opening pins (fixed so as not to rotate regardless of the movement of long fibers) or opening rolls (which can automatically or associatively rotate with the movement of long fibers) are systemically mounted toward the downstream side so as to extend across the right and left walls and so as to be fixed to or be rotatable (turnable) on the two walls. Incidentally, the opening pins or opening rolls may be mounted so as to form upper and lower rows (two or more rows) with a predetermined gap therebetween, for example. In the opening impregnation apparatus, by guiding a continuous fiber to the melted resin and moving it around the opening pins or opening rolls in zigzags, or by passing the continuous fiber through an intermediate region between two opening pins so as not to come into contact with any of these two opening pins installed as upper and lower pins so as to be separated from each other with a predetermined gap width therebetween, opening the roving and coating or impregnating the opened fibers with the melted resin may be performed.

Subsequently, a strand-like material extruded from the impregnation apparatus is cooled to a temperature lower than the melting temperature of the polyarylene sulfide resin, preferably to a room temperature (23° C.), and thus a strand formed by pultrusion-molding an endless fiber is obtained. In this case, the fiber reinforcing material or roving may be twisted. For example, plural, preferably 2 to 30, continuous fiber reinforcing materials or rovings may be passed through the impregnation apparatus, and the plural fiber reinforcing materials or rovings may be wound up while being twisted, to form a single strand. A long fiber-reinforced polyarylene sulfide resin composition according to the present invention is obtained as columnar pellets by cutting the obtained strand to a length of more than 5 mm, preferably more than 5 mm and 30 mm or less, more preferably 6 mm or more and 20 mm or less, and still more preferably 6 mm or more and 15 mm or less. Incidentally, the pellet diameter and the pellet length are not particularly limited as long as advantageous effects provided by the present invention are not impaired; the pellet diameter is preferably set to 1.0 to 6.0 mm, more preferably 1.5 to 4.0 mm. The pellet length is the same as the length to which the strand is cut.

The fiber reinforcing material obtained in this manner has an aspect ratio of 250 to 5000, preferably 600 to 4000, still more preferably 800 to 3000. To the fiber reinforcing material having a fiber length of more than 5 mm, a fiber reinforcing material having a fiber length of 5 mm or less may be added. Also in this case, the number-average aspect ratio is preferably adjusted to be 120 to 3000 from the viewpoint of maintaining advantageous effects provided by the invention.

Since the long fiber-reinforced polyarylene sulfide resin composition obtained in this manner is provided as the columnar pellets obtained by cutting the strand formed by pultrusion-molding an endless fiber, the fiber length of the fiber reinforcing material in such a pellet is equal to or larger than the length of the pellet. In the case of using such fibers having a large fiber length, the long fibers are physically entangled in the parison during melt molding, in particular, blow molding, and therefore, draw-down properties can be improved. Furthermore, in the case of applying, to the surfaces of the fibers, a sizing agent having reactivity for enhancing the interaction with the resin, adhesion of the fibers to the polyarylene sulfide resin is enhanced. This results in stronger adhesion at the interface between the fibers and the resin, so that draw-down properties can be improved. In addition, by using fibers having a large fiber length, mechanical properties, in particular, impact resistance can be improved.

Incidentally, in the long fiber-reinforced polyarylene sulfide resin composition, the proportions of the polyarylene sulfide resin (a1), the fiber reinforcing material, and the thermoplastic elastomer (b1), which is used as necessary, are not particularly limited as long as advantageous effects provided by the present invention are not impaired. However, the proportions may be as follows.

Specifically, with respect to the total 100 parts by mass of the polyarylene sulfide resin (a1) and the fiber reinforcing material, the proportion of the polyarylene sulfide resin (a1) is preferably 99 to 20 parts by mass, and the proportion of the fiber reinforcing material is 1 to 80 parts by mass; more preferably, the proportion of the polyarylene sulfide resin (a1) is 95 to 30 parts by mass, and the proportion of the fiber reinforcing material is 5 to 70 parts by mass. By employing such blending proportions, a molded article tends to be obtained that has excellent melt moldability, and has excellent mechanical properties represented by heat resistance, chemical resistance, and impact resistance; in particular, draw-down of the parison is less likely to occur during blow hollow molding and thus good blow moldability is exhibited, and a blow-molded hollow article that is excellent in heat resistance and chemical resistance tends to be obtained.

When the thermoplastic elastomer is further added to the long fiber-reinforced polyarylene sulfide resin composition, with respect to the total 100 parts by mass of the polyarylene sulfide resin (a1), the fiber reinforcing material, and the thermoplastic elastomer (b1), the proportion of the polyarylene sulfide resin (a1) is preferably 98 to 19 parts by mass, the proportion of the fiber reinforcing material is preferably 1 to 79 parts by mass, and the proportion of the thermoplastic elastomer (b1) is preferably 1 to 30 parts by mass; more preferably, the proportion of the polyarylene sulfide resin (a1) is 94 to 29 parts by mass, the proportion of the fiber reinforcing material is 5 to 69 parts by mass, and the proportion of the thermoplastic elastomer (b1) is 1 to 20 parts by mass. By employing such blending proportions, a molded article tends to be obtained that has excellent melt moldability, and has more excellent mechanical properties represented by heat resistance, chemical resistance, and, in particular, impact resistance; furthermore, the composition is suitable for a blow-molded hollow article, and draw-down of the parison is less likely to occur during blow hollow molding and thus good blow moldability is exhibited, and a blow-molded hollow article tends to be obtained that has excellent mechanical properties represented by heat resistance, chemical resistance, and, in particular, impact resistance.

A long fiber-reinforced polyarylene sulfide resin composition used in the present invention may further contain various fillers in order to further improve performances such as strength, heat resistance, and dimensional stability as long as advantageous effects provided by the present invention are not impaired. As such fillers, known conventional materials can be used as long as advantageous effects provided by the present invention are not impaired, and examples thereof include fillers having various forms such as a granular form and a fibrous form. Specifically, fibrous fillers can be used that have a fiber length of less than 6 mm, such as fibers, e.g., glass fibers, carbon fibers, ceramic fibers, aramid fibers, metal fibers, potassium titanate, silicon carbide, calcium sulfate, and calcium silicate, and natural fibers, e.g., wollastonite. Other examples include barium sulfate, calcium sulfate, clay, pyrophyllite, bentonite, sericite, zeolite, mica, isinglass, talc, attapulgite, ferrite, calcium silicate, calcium carbonate, magnesium carbonate, and glass beads. Such fillers used in the present invention are not essential components. However, the fillers are preferably added in an amount of more than 0 parts by mass, and generally in an amount of 10 parts by mass or more and 500 parts by mass or less with respect to 100 parts by mass of the polyarylene sulfide resin because various performances such as strength, stiffness, heat resistance, heat dissipation properties, or dimensional stability can be improved depending on the purpose of the fillers added.

In addition, a long fiber-reinforced polyarylene sulfide resin composition used in the present invention may contain known additives as long as advantageous effects provided by the present invention are not impaired. Examples of such known additives include mold release agents, colorants, heat resistance stabilizers, UV stabilizers, foaming agents, rust inhibitors, flame retardants, and lubricants; and examples of additives that may be appropriately added depending on the application include synthetic resins such as polyester, polyamide, polyimide, polyetherimide, polycarbonate, polyphenylene ether, polysulfone, polyether sulfone, polyether ether ketone, polyether ketone, polyarylene, polyethylene, polypropylene, polytetrafluoroethylene, polydifluoroethylene, polystyrene, ABS resins, epoxy resins, silicone resins, phenol resins, urethane resins, and liquid crystal polymers; elastomers such as polyolefin-based rubber, fluororubber, and silicone rubber; and coupling agents such as silane coupling agents. Such additives used in the present invention are not essential components. However, the additives are preferably added in an amount of more than 0 parts by mass, and generally in an amount of 10 parts by mass or more and 500 parts by mass or less with respect to 100 parts by mass of the polyarylene sulfide resin because various performances can be improved depending on the purpose of the additive added.

For a long fiber-reinforced polyarylene sulfide resin molded article according to the present invention, a long fiber-reinforced polyarylene sulfide resin composition used in the present invention is dry-blended with a polyarylene sulfide resin.

The proportions of the long fiber-reinforced polyarylene sulfide resin composition and the polyarylene sulfide resin (a2) are not particularly limited as long as advantageous effects provided by the present invention are not impaired; however, with respect to the total 100 parts by mass of the long fiber-reinforced polyarylene sulfide resin composition and the polyarylene sulfide resin (a2), the proportion of the long fiber-reinforced polyarylene sulfide resin composition is preferably 2 to 98 parts by mass, and the proportion of the polyarylene sulfide resin (a2) is preferably 98 to 2 parts by mass; more preferably, the proportion of the long fiber-reinforced polyarylene sulfide resin composition is 5 to 95 parts by mass, and the proportion of the polyarylene sulfide resin (a2) is 95 to 5 parts by mass; and particularly preferably, the proportion of the long fiber-reinforced polyarylene sulfide resin composition is 10 to 90 parts by mass, and the proportion of the polyarylene sulfide resin (a2) is 90 to 10 parts by mass.

When, as a component dry-blended with the long fiber-reinforced polyarylene sulfide resin composition, the thermoplastic elastomer (b2) is further added to the polyarylene sulfide resin (a2), the proportions of the long fiber-reinforced polyarylene sulfide resin composition, the polyarylene sulfide resin (a2), and the thermoplastic elastomer (b2) are not particularly limited as long as advantageous effects provided by the present invention are not impaired; however, with respect to the total 100 parts by mass of the long fiber-reinforced polyarylene sulfide resin composition, the polyarylene sulfide resin (a2), and the thermoplastic elastomer (b2), the proportion of the long fiber-reinforced polyarylene sulfide resin composition is preferably 2 to 98 parts by mass, and the total proportion of the polyarylene sulfide resin (a2) and the thermoplastic elastomer (b2) is preferably 98 to 2 parts by mass; more preferably, the proportion of the long fiber-reinforced polyarylene sulfide resin composition is 5 to 95 parts by mass, and the total proportion of the polyarylene sulfide resin (a2) and the thermoplastic elastomer (b2) is 95 to 5 parts by mass; and particularly preferably, the proportion of the long fiber-reinforced polyarylene sulfide resin composition is 10 to 90 parts by mass, and the total proportion of the polyarylene sulfide resin (a2) and the thermoplastic elastomer (b2) is 90 to 10 parts by mass.

In this case, the proportions of the polyarylene sulfide resin (a2) and the thermoplastic elastomer (b2) are not particularly limited as long as advantageous effects provided by the present invention are not impaired; however, with respect to the total 100 parts by mass of the polyarylene sulfide resin (a2) and the thermoplastic elastomer (b2), the proportion of the polyarylene sulfide resin (a2) is preferably 99.9 to 50 parts by mass, and the proportion of the thermoplastic elastomer (b2) is preferably 0.1 to 50 parts by mass; more preferably, the proportion of the polyarylene sulfide resin (a2) is 99 to 70 parts by mass, and the proportion of the thermoplastic elastomer (b2) is 1 to 30 parts by mass; and particularly preferably, the proportion of the polyarylene sulfide resin (a2) is 95 to 80 parts by mass, and the proportion of the thermoplastic elastomer (b2) is 5 to 20 parts by mass.

In the dry blending, the shapes of the polyarylene sulfide resin (a2) and the thermoplastic elastomer (b2) are not particularly limited; and examples of the shapes include powder, particles, granules, strands, rods, needles, plates, tubes, blocks, and pellets. The shape of pellets is preferred because the resin and the elastomer can be easily and uniformly mixed.

The dry blending may be performed by a known method: for example, the long fiber-reinforced polyarylene sulfide resin composition, the polyarylene sulfide resin, and the thermoplastic elastomer (b2), which is added as necessary, may be put into a ribbon blender, a Henschel mixer, a V blender, or the like, and dry-blended, to prepare a dry-blended substance.

Such a dry-blended substance obtained in this manner and used in the present invention is appropriately prepared in accordance with the types and proportions of the polyarylene sulfide resin, the fiber reinforcing material, and the thermoplastic elastomer used as necessary. In particular, in the case of performing blow hollow molding, the melt flow rate is preferably set to 10 to 100 g/10 min, more preferably 20 to 80 g/10 min, still more preferably 30 to 60 g/10 min. Such a range is preferably satisfied because variations in the thickness of the molded article tend to be suppressed, to thereby provide a blow molded article having excellent uniformity. In addition, a melt flow rate of 10 g/10 min or higher is preferably satisfied because gelation tends to be suppressed.

Incidentally, the melt flow rate is determined by putting the dry-blended substance into a melt indexer at a cylinder temperature of 316° C. with an orifice diameter of 3 mm, applying a load of 10 kg, and, after preheating for 5 minutes, measuring the melt flow rate (g/10 min).

Regarding a long fiber-reinforced polyarylene sulfide resin molded article according to the present invention, dry blending is performed to maintain excellent heat resistance of the polyarylene sulfide resin, and a fiber reinforcing material having a large fiber length is contained to thereby provide a molded article having more excellent mechanical properties such as impact resistance. In particular, a blow-molded hollow article can be provided that maintains the excellent heat resistance of the polyarylene sulfide resin, that is also excellent in moldability in terms of draw-down properties and thickness unevenness during blow hollow molding, and that is also excellent in mechanical strengths such as impact resistance.

The obtained dry-blended substance is subsequently melted, turned into a melted and kneaded substance, and extruded. The melted and kneaded substance may be temporarily processed into pellets or the like, or may be directly molded by blow hollow molding or the like.

When the obtained dry-blended substance is melted, it is heated at a temperature not less than the melting point of the polyarylene sulfide resin. When the polyarylene sulfide resin (a1) and the polyarylene sulfide resin (a2) have different melting points, the heating is performed at a temperature not less than the higher melting point. When the dry-blended substance is melted and turned into a melted and kneaded substance and then temporarily processed into pellets or the like, the pellets or the like are heated and melted again, as with the dry-blended substance, at a temperature not less than the melting point of the polyarylene sulfide resin, and then molded by blow hollow molding or the like.

The molding method may be a known method as long as advantageous effects provided by the present invention are not impaired. For example, preferably, the dry-blended substance is supplied to a melt extruder having a single screw, heated and melted at a temperature not less than the melting point of the polyarylene sulfide resin, preferably heated and melted at 290 to 320° C., melt-extruded, and then molded.

More specifically, for example, the following method may be employed: melt-extrusion is performed under conditions at a screw rotation speed of 50 to 250 rpm and at a discharge rate of 5 to 25 kg/h; and then molding into the intended molded article is performed. In the case of blow molding, for example, the following method may be employed: after melt-extrusion, a parison is formed with a die gap of 1 to 10 mm, and is subsequently molded into the intended two- or three-dimensional molded hollow article.

Examples of the screw form include full-flight-type single screws, and single screws having a mixing mechanism of, for example, a Dulmage type, a Maddock type, or a pin-equipped type. Since fragmentation of the fiber reinforcing material by shearing during melting of the resin can be suppressed, single screws that have a compression ratio of 2 or less are preferably used; more preferably, single screws that have a compression ratio of 2 or less and 1 or more are used; particularly preferably, single screws that are full-flight-type single screws and have a compression ratio of 2 or less are used.

The effective length (L/D) is not particularly limited as long as it is a value used for molding a normal polyarylene sulfide resin. The effective length (L/D) is, for example, 1 to 100, preferably 5 to 50.

Various molding methods can be performed such as injection molding; compression molding; extrusion molding for composites, sheets, pipes, or the like; pultrusion molding; blow molding; or transfer molding. In particular, the blow molding method is preferred because it provides excellent moldability in terms of draw-down resistance or thickness unevenness. Representative examples of the blow molding method include a direct blow method, an accumulator blow method, and a multi-dimensional blow method. Alternatively, it is clearly possible to employ a multilayer blow molding method, an exchange blow molding method, or the like, which are used in the case of combination with another material.

A long fiber-reinforced polyarylene sulfide resin molded article according to the present invention obtained in this manner contains a polyarylene sulfide resin and a fiber reinforcing material that has a fiber length of more than 5 mm, preferably more than 5 mm and 30 mm or less, more preferably 6 mm or more and 20 mm or less, still more preferably 10 mm or more and 15 mm or less. In particular, in the case of blow-molded hollow articles, as in dry-blended substances, the melt flow rate is preferably set to 10 to 100 g/10 min, more preferably 20 to 80 g/10 min, still more preferably 30 to 60 g/10 min.

In a long fiber-reinforced polyarylene sulfide resin molded article according to the present invention, the proportions of the polyarylene sulfide resin, the fiber reinforcing material, and the thermoplastic elastomer, which is added as necessary, are the same as the proportions of the total amounts of the components added as raw materials in the above-described production method: specifically, the proportion of the total amount of the polyarylene sulfide resin (a1) and the polyarylene sulfide resin (a2), the proportion of the fiber reinforcing material, and the proportion of the total amount of the thermoplastic elastomer (b1) and the thermoplastic elastomer (b2), which are added as necessary. However, with respect to the total 100 parts by mass of the polyarylene sulfide resin and the fiber reinforcing material, the proportion of the polyarylene sulfide resin is preferably 99 to 25 parts by mass, and the proportion of the fiber reinforcing material is preferably 1 to 75 parts by mass; more preferably, the proportion of the polyarylene sulfide resin is 95 to 35 parts by mass, and the proportion of the fiber reinforcing material is 5 to 65 parts by mass. When the thermoplastic elastomer is added as necessary, with respect to the total 100 parts by mass of the polyarylene sulfide resin, the fiber reinforcing material, and the thermoplastic elastomer, the proportion of the polyarylene sulfide resin is preferably 98 to 24 parts by mass, the proportion of the fiber reinforcing material is preferably 1 to 74 parts by mass, and the proportion of the thermoplastic elastomer is preferably 0.1 to 30; more preferably, the proportion of the polyarylene sulfide resin is 94 to 34 parts by mass, the proportion of the fiber reinforcing material is 4 to 64 parts by mass, and the proportion of the thermoplastic elastomer is 1 to 20.

A long fiber-reinforced polyarylene sulfide resin molded article according to the present invention has excellent moldability, and is also excellent in various performances such as heat resistance, dimensional stability, and chemical resistance, which are inherent in polyarylene sulfide resins, and mechanical strengths such as impact resistance and thermal shock resistance. Thus, the molded article can be widely used not only for injection-molded articles, compression-molded articles, or metal-inserted molded articles for, for example, electrical or electronic components such as connectors, printed boards, and sealing-molded articles, automobile parts such as reflector lamps and various electrical components, interior materials for various buildings, aircraft, automobiles, and the like, OA equipment parts, and precision parts such as camera parts and watch components, but also for, as a molded hollow article such as a bottle, a tank, or a duct, containers for medicinal solutions, air-conditioning ducts, ducts and pipes for high-temperature gases discharged from internal combustion engines such as those for automobiles or fuel cells, and the like.

EXAMPLES

Hereinafter, the present invention will be specifically described with reference to examples; however, the present invention is not limited only to these examples.

Production Examples 1 to 3

(Production of Long Fiber-Reinforced Polyarylene Sulfide Resin Compositions)

While a polyarylene sulfide resin described in Table 1 was put into a twin-screw extruder, and melted and kneaded at a resin composition discharge rate of 25 kg/hr, a screw rotation speed of 250 rpm, and a cylinder setting temperature of 310° C., a roving (fiber diameter: 10 μm) of glass fibers described in Table 1 was continuously supplied to an impregnation die installed at the tip of the extruder so as to satisfy a proportion described in Table 1, and was extruded to prepare a strand-like material in which the glass fibers were coated with the melted polyarylene sulfide resin. Then, the strand-like material was cooled with air to 23° C. to obtain a strand, and the strand was cut to a length of 10 mm using a strand cutter to thereby obtain fiber-reinforced polyarylene sulfide resin composition pellets (CP).

TABLE 1

|  | Production Example 1 CP1 | Production Example 2 CP2 | Production Example 3 CP3 |
|---|---|---|---|
| PPS (1) |  |  |  |
| PPS (2) | 80.0 | 60.0 | 40.0 |
| PPS (3) |  |  |  |
| Fiber Reinforcing Material (1) | 20.0 | 40.0 | 60.0 |
| Fiber Reinforcing Material (2) |  |  |  |
| Polyolefin (1) |  |  |  |
| Polyolefin (2) |  |  |  |
| Polyolefin (3) |  |  |  |

Production Examples 4 to 6

(Production of Polyolefin Resin-Containing Polyarylene Sulfide Resin Compositions)

A polyarylene sulfide resin and a polyolefin described in Table 2 were put into a twin-screw extruder, and melted and kneaded at a resin composition discharge rate of 25 kg/hr, a screw rotation speed of 250 rpm, and a cylinder setting temperature of 310° C., and subsequently extruded through a T die installed at the tip of the extruder to thereby produce a strand-like material. After that, the strand-like material was cooled with air to 23° C. to obtain a strand, and the strand was cut to a length of 10 mm using a strand cutter to thereby obtain polyarylene sulfide resin composition pellets (CP).

TABLE 2

|  | Production Example 4 CP4 | Production Example 5 CP5 | Production Example 6 CP6 | Production Example 7 CP7 | Production Example 8 CP8 |
|---|---|---|---|---|---|
| PPS (1) |  |  |  |  |  |
| PPS (2) | 86.0 | 86.0 | 86.0 | 99.0 | 70.0 |
| PPS (3) |  |  |  |  |  |
| Fiber Reinforcing Material (1) |  |  |  |  |  |
| Fiber Reinforcing Material (2) |  |  |  |  |  |
| Polyolefin (1) | 14.0 |  |  | 1.0 | 30.0 |
| Polyolefin (2) |  | 14.0 |  |  |  |
| Polyolefin (3) |  |  | 14.0 |  |  |

Production Examples 9 to 11

(Production of Polyolefin Resin-Containing Long Fiber-Reinforced Polyarylene Sulfide Resin Compositions)

As described in Table 3, a polyarylene sulfide resin and a polyolefin resin were mixed with a Henschel mixer at proportions described in Table 3. Subsequently, the mixture was put into a twin-screw extruder. While the mixture was melted and kneaded at a resin composition discharge rate of 25 kg/hr, a screw rotation speed of 250 rpm, and a cylinder setting temperature of 310° C., a roving (fiber diameter: 10 μm) of glass fibers described in Table 1 was continuously supplied to an impregnation die installed at the tip of the extruder so as to satisfy a proportion described in Table 1 and extrusion was performed to prepare a strand-like material in which the glass fibers were coated with the melted polyarylene sulfide resin and polyolefin resin. After that, the strand-like material was cooled with air to 23° C. to obtain a strand, and the strand was cut to a length of 10 mm using a strand cutter to thereby obtain fiber-reinforced polyarylene sulfide resin composition pellets (CP).

TABLE 3

|  | Production Example 9 CP9 | Production Example 10 CP10 | Production Example 11 CP11 |
|---|---|---|---|
| PPS (1) |  |  |  |
| PPS (2) | 66.0 | 46.0 | 26.0 |
| PPS (3) |  |  |  |
| Fiber Reinforcing Material (1) | 20.0 | 40.0 | 60.0 |
| Fiber Reinforcing Material (2) |  |  |  |
| Polyolefin (1) | 14.0 | 14.0 | 14.0 |
| Polyolefin (2) |  |  |  |
| Polyolefin (3) |  |  |  |

Production Examples 12 to 14

(Production of Short Fiber Reinforcing Material-Containing Polyarylene Sulfide Resin Compositions)

A polyarylene sulfide resin described in Table 4 was put into a twin-screw extruder, and glass fibers were supplied through a side feeder 1 as described in Table 4. These materials were melted and kneaded at a resin composition discharge rate of 25 kg/hr, a screw rotation speed of 250 rpm, and a cylinder setting temperature of 310° C., and subsequently extruded through a T die installed at the tip of the extruder to prepare a strand-like material. After that, the strand-like material was cooled with air to 23° C. to obtain a strand, and the strand was cut to a length of 10 mm using a strand cutter to thereby obtain polyarylene sulfide resin composition pellets (CP).

TABLE 4

|  | Production Example 12 CP12 | Production Example 13 CP13 | Production Example 14 CP14 |
|---|---|---|---|
| PPS (1) |  |  |  |
| PPS (2) | 80.0 | 60.0 | 40.0 |
| PPS (3) |  |  |  |
| Fiber Reinforcing Material (1) |  |  |  |
| Fiber Reinforcing Material (2) | 20.0 | 40.0 | 60.0 |
| Polyolefin (1) |  |  |  |
| Polyolefin (2) |  |  |  |
| Polyolefin (3) |  |  |  |

Production Examples 15 to 17

(Production of Polyolefin Resin- and Short Fiber Reinforcing Material-Containing Polyarylene Sulfide Resin Compositions)

A polyarylene sulfide resin and a polyolefin resin described in Table 5 were put into a twin-screw extruder, and glass fibers were supplied through a side feeder as described in Table 5. These materials were melted and kneaded at a resin composition discharge rate of 25 kg/hr, a screw rotation speed of 250 rpm, and a cylinder setting temperature of 310° C., and subsequently extruded through a T die installed at the tip of the extruder to prepare a strand-like material. After that, the strand-like material was cooled with air to 23° C. to obtain a strand, and the strand was cut to a length of 10 mm using a strand cutter to thereby obtain polyarylene sulfide resin composition pellets (CP).

TABLE 5

|  | Production Example 15 CP15 | Production Example 16 CP16 | Production Example 17 CP17 |
|---|---|---|---|
| PPS (1) |  |  |  |
| PPS (2) | 66.0 | 46.0 | 26.0 |
| PPS (3) |  |  |  |
| Fiber Reinforcing Material (1) |  |  |  |
| Fiber Reinforcing Material (2) | 20.0 | 40.0 | 60.0 |
| Polyolefin (1) | 14.0 | 14.0 | 14.0 |
| Polyolefin (2) |  |  |  |
| Polyolefin (3) |  |  |  |

Examples 1 to 7

(Preparation of Dry-Blended Substances)

As described in Table 6, the long fiber-reinforced polyarylene sulfide resin composition pellets (CPs 1 to 3) and polyarylene sulfide resins were put into a "MAZEMAZE MAN HBT-500) manufactured by MISUGI LTD., and dry-blended to obtain dry-blended substances (DBs 1 to 7).

A portion of such an obtained dry-blended substance was sampled and subjected to measurements (Table 6).

TABLE 6

|  | Examples | | | | | | |
|---|---|---|---|---|---|---|---|
|  | 1 DB1 | 2 DB2 | 3 DB3 | 4 DB4 | 5 DB5 | 6 DB6 | 7 DB7 |
| PPS (1) |  |  |  |  |  |  |  |
| PPS (2) | 75.0 |  | 87.5 | 91.5 | 62.5 | 75.0 | 17.0 |
| PPS (3) |  | 75.0 |  |  |  |  |  |
| CP1 | 25.0 | 25.0 |  |  |  |  |  |
| CP2 |  |  | 12.5 |  | 37.5 |  |  |
| CP3 |  |  |  | 8.5 |  | 25.0 | 83.0 |
| Evaluations for Dry-Blended Substances |  |  |  |  |  |  |  |
| Fiber Reinforcing Material Content (wt %) | 5.0 | 5.0 | 5.0 | 5.0 | 15.0 | 15.0 | 50.0 |
| Number-Average Fiber Length of Fiber Reinforcing Material (mm) | 10 | 10 | 10 | 10 | 10 | 10 | 10 |
| Aspect Ratio of Fiber Reinforcing Material | 1000 | 1000 | 1000 | 1000 | 1000 | 1000 | 1000 |
| MFR (g/10 min) | 90 | 43 | 90 | 90 | 76 | 76 | 20 |
| Draw-Down Resistance/Extrusion Stability | ◯ | ◯ | ◯ | ◯ | ◯ | ◯ | ◯ |

(Production of Blow-Molded Articles)

Subsequently, the obtained dry-blended substances (DBs 1 to 7) were each supplied to a blow molding machine equipped with a φ45 mm-extruder (a full-flight-type single screw having a compression ratio of 1), and extruded at a resin composition discharge rate of 25 kg/hr, a screw rotation speed of 250 rpm, and a cylinder setting temperature of 290° C. to form a parison having an outer diameter of 30 mm and a thickness of 4 mm. After that, air was blown into the parison within the mold, to thereby form a cylindrical container having a height of 250 mm, an outer diameter of 50 mm, and a thickness of approximately 2 to 3 mm.

The obtained blow-molded hollow articles were subjected to measurements (Table 7).

TABLE 7

| | Examples | | | | | | |
|---|---|---|---|---|---|---|---|
| | 1 DB1 | 2 DB2 | 3 DB3 | 4 DB4 | 5 DB5 | 6 DB6 | 7 DB7 |
| Evaluations for Blow-Molded Hollow Articles | | | | | | | |
| Number-Average Fiber Length of Fiber Reinforcing Material (mm) | 10 | 10 | 10 | 10 | 10 | 10 | 10 |
| Inner-Surface Smoothness | ⊙ | ⊙ | ⊙ | ⊙ | ⊙ | ⊙ | ○ |
| Thickness Uniformity | ⊙ | ⊙ | ⊙ | ⊙ | ⊙ | ⊙ | ○ |
| Heat Resistance | ⊙ | ⊙ | ⊙ | ⊙ | ⊙ | ⊙ | ⊙ |
| Impact Resistance (kJ/m$^2$) | 18 | 20 | 18 | 18 | 25 | 25 | 70 |

Examples 8 to 14

(Preparation of Dry-Blended Substances)

As described in Table 8, the polyolefin resin-containing long fiber-reinforced polyarylene sulfide resin composition pellets (CPs 9 to 11) and polyarylene sulfide resins were put into a "MAZEMAZE MAN HBT-500) manufactured by MISUGI LTD. and dry-blended to obtain dry-blended substances (DBs 9 to 16).

A portion of such an obtained dry-blended substance was sampled and subjected to measurements (Table 8).

TABLE 8

| | Examples | | | | | | |
|---|---|---|---|---|---|---|---|
| | 8 DB8 | 9 DB9 | 10 DB10 | 11 DB11 | 12 DB12 | 13 DB13 | 14 DB14 |
| PPS (1) | | | | | | | |
| PPS (2) | 75.0 | | 87.5 | 91.5 | 62.5 | 75.0 | 17.0 |
| PPS (3) | | 75.0 | | | | | |
| CP9 | 25.0 | 25.0 | | | | | |
| CP10 | | | 12.5 | | 37.5 | | |
| CP11 | | | | 8.5 | | 25.0 | 83.0 |
| Evaluations for Dry-Blended Substances | | | | | | | |
| Fiber Reinforcing Material Content (wt %) | 5.0 | 5.0 | 5.0 | 5.0 | 15.0 | 15.0 | 50.0 |
| Number-Average Fiber Length of Fiber Reinforcing Material (mm) | 10 | 10 | 10 | 10 | 10 | 10 | 10 |
| Aspect Ratio of Fiber Reinforcing Material | 1000 | 1000 | 1000 | 1000 | 1000 | 1000 | 1000 |
| MFR (g/10 min) | 80 | 38 | 84 | 88 | 56 | 60 | 14 |
| Draw-Down Resistance/Extrusion Stability | ○ | ○ | ○ | ○ | ○ | ○ | ○ |

(Production of Blow-Molded Articles)

Subsequently, the obtained dry-blended substances (DBs 9 to 16) were each supplied to a blow molding machine equipped with a φ45 mm-extruder (a full-flight-type single screw having a compression ratio of 1), and extruded at a resin composition discharge rate of 25 kg/hr, a screw rotation speed of 250 rpm, and a cylinder setting temperature of 290° C. to form a parison having an outer diameter of 30 mm and a thickness of 4 mm. After that, air was blown into the parison within the mold, to thereby form a cylindrical container having a height of 250 mm, an outer diameter of 50 mm, and a thickness of approximately 2 to 3 mm.

The obtained blow-molded hollow articles were subjected to measurements (Table 9).

TABLE 9

| | Examples | | | | | | |
|---|---|---|---|---|---|---|---|
| | 8 DB8 | 9 DB9 | 10 DB10 | 11 DB11 | 12 DB12 | 13 DB13 | 14 DB14 |
| Evaluations for Blow-Molded Hollow Articles | | | | | | | |
| Number-Average Fiber Length of Fiber Reinforcing Material (mm) | 10 | 10 | 10 | 10 | 10 | 10 | 10 |
| Inner-Surface Smoothness | ⊙ | ⊙ | ⊙ | ⊙ | ⊙ | ⊙ | ○ |
| Thickness Uniformity | ⊙ | ⊙ | ⊙ | ⊙ | ⊙ | ⊙ | ○ |
| Heat Resistance | ⊙ | ⊙ | ⊙ | ⊙ | ⊙ | ⊙ | ⊙ |
| Impact Resistance (kJ/m$^2$) | 30 | 32 | 26 | 25 | 46 | 43 | 104 |

Examples 15 to 22

(Preparation of Dry-Blended Substances)

As described in Table 10, the long fiber-reinforced polyarylene sulfide resin composition pellets (CPs 1 to 3) and polyolefin resin-containing polyarylene sulfide resins (CPs 4 to 8) were put into a "MAZEMAZE MAN HBT-500) manufactured by MISUGI LTD. and dry-blended to obtain dry-blended substances (DBs 15 to 22).

A portion of such an obtained dry-blended substance was sampled and subjected to measurements (Table 10).

TABLE 10

|  | Examples | | | | | | |
| --- | --- | --- | --- | --- | --- | --- | --- |
|  | 15 DB15 | 16 DB16 | 17 DB17 | 18 DB18 | 19 DB19 | 21 DB21 | 22 DB22 |
| CP1 | 25.0 | 25.0 | 25.0 | 25.0 | | | |
| CP2 | | | | | 37.5 | | |
| CP3 | | | | | | 25.0 | 83.0 |
| CP4 | 75.0 | | | | 62.5 | 75.0 | 17.0 |
| CP5 | | 75.0 | | | | | |
| CP6 | | | 75.0 | | | | |
| CP7 | | | | | | | |
| CP8 | | | | 75.0 | | | |
| Evaluations for Dry-Blended Substances | | | | | | | |
| Fiber Reinforcing Material Content (wt %) | 5.0 | 5.0 | 5.0 | 5.0 | 15.0 | 15.0 | 50.0 |
| Number-Average Fiber Length of Fiber Reinforcing Material (mm) | 10 | 10 | 10 | 10 | 10 | 10 | 10 |
| Aspect Ratio of Fiber Reinforcing Material | 1000 | 1000 | 1000 | 1000 | 1000 | 1000 | 1000 |
| MFR (g/10 min) | 73 | 78 | 80 | 76 | 50 | 47 | 18 |
| Draw-Down Resistance/Extrusion Stability | ○ | ○ | ○ | ○ | ○ | ○ | ○ |

(Production of Blow-Molded Articles)

Subsequently, the obtained dry-blended substances (DBs 15 to 22) were each supplied to a blow molding machine equipped with a ϕ45 mm-extruder (a full-flight-type single screw having a compression ratio of 1, and an effective length L/D ratio of 30), and extruded at a resin composition discharge rate of 25 kg/hr, a screw rotation speed of 250 rpm, and a cylinder setting temperature of 290° C. to form a parison having an outer diameter of 30 mm and a thickness of 4 mm. After that, air was blown into the parison within the mold, to thereby form a cylindrical container having a height of 250 mm, an outer diameter of 50 mm, and a thickness of approximately 2 to 3 mm.

The obtained blow-molded hollow articles were subjected to measurements (Table 11).

TABLE 11

|  | Examples | | | | | | |
| --- | --- | --- | --- | --- | --- | --- | --- |
|  | 15 DB15 | 16 DB16 | 17 DB17 | 18 DB18 | 19 DB19 | 21 DB21 | 22 DB22 |
| Evaluations for Blow-Molded Hollow Articles | | | | | | | |
| Number-Average Fiber Length of Fiber Reinforcing Material (mm) | 10 | 10 | 10 | 10 | 10 | 10 | 10 |

TABLE 11-continued

|  | Examples | | | | | | |
| --- | --- | --- | --- | --- | --- | --- | --- |
|  | 15 DB15 | 16 DB16 | 17 DB17 | 18 DB18 | 19 DB19 | 21 DB21 | 22 DB22 |
| Inner-Surface Smoothness | ⊙ | ⊙ | ⊙ | ⊙ | ⊙ | ⊙ | ○ |
| Thickness Uniformity | ⊙ | ⊙ | ⊙ | ⊙ | ⊙ | ⊙ | ○ |
| Heat Resistance | ⊙ | ⊙ | ⊙ | ⊙ | ⊙ | ⊙ | ⊙ |
| Impact Resistance (kJ/m$^2$) | 50 | 48 | 45 | 35 | 49 | 52 | 85 |

Examples 23 to 30

(Preparation of Dry-Blended Substances)

As described in Table 12, the polyolefin resin-containing long fiber-reinforced polyarylene sulfide resin composition pellets (CPs 9 to 11) and the polyolefin resin-containing polyarylene sulfide resin compositions (CPs 4 to 8) were put into a "MAZEMAZE MAN HBT-500) manufactured by MISUGI LTD. and dry-blended to obtain dry-blended substances (DBs 23 to 30).

A portion of such an obtained dry-blended substance was sampled and subjected to measurements (Table 12).

TABLE 12

|  | Examples | | | | | | | |
| --- | --- | --- | --- | --- | --- | --- | --- | --- |
|  | 23 DB23 | 24 DB24 | 25 DB25 | 26 DB26 | 27 DB27 | 28 DB28 | 29 DB29 | 30 DB30 |
| CP9 | 25.0 | 25.0 | 25.0 | 25.0 | 25.0 | | | |
| CP10 | | | | | | 37.5 | | |
| CP11 | | | | | | | 25.0 | 83.0 |
| CP4 | 75.0 | | | | | 62.5 | 75.0 | 17.0 |
| CP5 | | 75.0 | | | | | | |
| CP6 | | | 75.0 | | | | | |
| CP7 | | | | 75.0 | | | | |
| CP8 | | | | | 75.0 | | | |

TABLE 12-continued

| | Examples | | | | | | | |
|---|---|---|---|---|---|---|---|---|
| | 23 DB23 | 24 DB24 | 25 DB25 | 26 DB26 | 27 DB27 | 28 DB28 | 29 DB29 | 30 DB30 |
| Evaluations for Dry-Blended Substances | | | | | | | | |
| Fiber Reinforcing Material Content (wt %) | 5.0 | 5.0 | 5.0 | 5.0 | 5.0 | 15.0 | 15.0 | 50.0 |
| Number-Average Fiber Length of Fiber Reinforcing Material (mm) | 10 | 10 | 10 | 10 | 10 | 10 | 10 | 10 |
| Aspect Ratio of Fiber Reinforcing Material | 1000 | 1000 | 1000 | 1000 | 1000 | 1000 | 1000 | 1000 |
| MFR (g/10 min) | 72 | 75 | 77 | 79 | 75 | 50 | 50 | 12 |
| Draw-Down Resistance/Extrusion Stability | ○ | ○ | ○ | ○ | ○ | ○ | ○ | ○ |

(Production of Blow-Molded Articles)

Subsequently, the obtained dry-blended substances (DBs 23 to 30) were each supplied to a blow molding machine equipped with a φ45 mm-extruder (a full-flight-type single screw having a compression ratio of 1, and an effective length L/D ratio of 30), and extruded at a resin composition discharge rate of 25 kg/hr, a screw rotation speed of 250 rpm, and a cylinder setting temperature of 290° C. to form a parison having an outer diameter of 30 mm and a thickness of 4 mm. After that, air was blown into the parison within the mold, to thereby form a cylindrical container having a height of 250 mm, an outer diameter of 50 mm, and a thickness of approximately 2 to 3 mm.

The obtained blow-molded hollow articles were subjected to measurements (Table 13).

TABLE 13

| | Examples | | | | | | | |
|---|---|---|---|---|---|---|---|---|
| | 23 DB23 | 24 DB24 | 25 DB25 | 26 DB26 | 27 DB27 | 28 DB28 | 29 DB29 | 30 DB30 |
| Evaluations for Blow-Molded Hollow Articles | | | | | | | | |
| Number-Average Fiber Length of Fiber Reinforcing Material (mm) | 10 | 10 | 10 | 10 | 10 | 10 | 10 | 10 |
| Inner-Surface Smoothness | ⊙ | ⊙ | ⊙ | ⊙ | ⊙ | ⊙ | ⊙ | ○ |
| Thickness Uniformity | ⊙ | ⊙ | ⊙ | ⊙ | ⊙ | ⊙ | ⊙ | ○ |
| Heat Resistance | ⊙ | ⊙ | ⊙ | ⊙ | ⊙ | ⊙ | ⊙ | ⊙ |
| Impact Resistance (kJ/m²) | 55 | 53 | 52 | 32 | 44 | 67 | 67 | 120 |

Examples 31 to 35

(Preparation of Dry-Blended Substances)

As described in Table 14, the long fiber-reinforced polyarylene sulfide resin composition pellets (CPs 1 to 3) and the short fiber reinforcing material-containing polyarylene sulfide resin compositions (CPs 12 to 14) were put into a "MAZEMAZE MAN HBT-500) manufactured by MISUGI LTD. and dry-blended to obtain dry-blended substances (DBs 31 to 35).

A portion of such an obtained dry-blended substance was sampled and subjected to measurements (Table 14).

TABLE 14

| | Examples | | | | |
|---|---|---|---|---|---|
| | 31 DB31 | 32 DB32 | 33 DB33 | 34 DB34 | 35 DB35 |
| CP1 | 50.0 | 50.0 | 50.0 | | |
| CP2 | | | | 50.0 | |
| CP3 | | | | | 50.0 |
| CP12 | 50.0 | | | 50.0 | 50.0 |
| CP13 | | 50.0 | | | |
| CP14 | | | 50.0 | | |
| Evaluations for Dry-Blended Substances | | | | | |
| Fiber Reinforcing Material Content (wt %) | 20.0 | 30.0 | 40.0 | 30.0 | 40.0 |

TABLE 14-continued

| | Examples | | | | |
|---|---|---|---|---|---|
| | 31 DB31 | 32 DB32 | 33 DB33 | 34 DB34 | 35 DB35 |
| Number-Average Fiber Length of Fiber Reinforcing Material (mm) | 5.2 | 3.5 | 2.8 | 6.8 | 7.8 |
| Average Aspect Ratio of Fiber Reinforcing Material | 520 | 350 | 280 | 680 | 780 |
| MFR (g/10 min) | 78 | 74 | 72 | 65 | 48 |
| Draw-Down Resistance/Extrusion Stability | ○ | ○ | ○ | ○ | ○ |

(Production of Blow-Molded Articles)

Subsequently, the obtained dry-blended substances (DBs 31 to 35) were each supplied to a blow molding machine equipped with a ϕ45 mm-extruder (a full-flight-type single screw having a compression ratio of 1, and an effective length L/D ratio of 30), and extruded at a resin composition discharge rate of 25 kg/hr, a screw rotation speed of 250 rpm, and a cylinder setting temperature of 290° C. to form a parison having an outer diameter of 30 mm and a thickness of 4 mm. After that, air was blown into the parison within the mold, to thereby form a cylindrical container having a height of 250 mm, an outer diameter of 50 mm, and a thickness of approximately 2 to 3 mm.

The obtained blow-molded hollow articles were subjected to measurements (Table 15).

TABLE 15

| | Examples | | | | |
|---|---|---|---|---|---|
| | 31 DB31 | 32 DB32 | 33 DB33 | 34 DB34 | 35 DB35 |
| Evaluations for Blow-Molded Hollow Articles | | | | | |
| Number-Average Fiber Length of Fiber Reinforcing Material (mm) | 5.2 | 3.5 | 2.8 | 6.8 | 7.8 |
| Inner-Surface Smoothness | ⊙ | ⊙ | ⊙ | ⊙ | ⊙ |
| Thickness Uniformity | ⊙ | ⊙ | ⊙ | ⊙ | ⊙ |
| Heat Resistance | ⊙ | ⊙ | ⊙ | ⊙ | ⊙ |
| Impact Resistance (kJ/m$^2$) | 22 | 24 | 25 | 32 | 52 |

Examples 36 to 40

(Preparation of Dry-Blended Substances)

As described in Table 16, the polyolefin resin-containing long fiber-reinforced polyarylene sulfide resin composition pellets (CPs 9 to 11) and the short fiber reinforcing material-containing polyarylene sulfide resin compositions (CPs 12 to 14) were put into a "MAZEMAZE MAN HBT-500) manufactured by MISUGI LTD. and dry-blended to obtain dry-blended substances (DBs 36 to 40).

A portion of such an obtained dry-blended substance was sampled and subjected to measurements (Table 16).

TABLE 16

| | Examples | | | | |
|---|---|---|---|---|---|
| | 36 DB36 | 37 DB37 | 38 DB38 | 39 DB39 | 40 DB40 |
| CP9 | 50.0 | 50.0 | 50.0 | | |
| CP10 | | | | 50.0 | |
| CP11 | | | | | 50.0 |
| CP12 | 50.0 | | | 50.0 | 50.0 |
| CP13 | | 50.0 | | | |
| CP14 | | | 50.0 | | |
| Evaluations for Dry-Blended Substances | | | | | |
| Fiber Reinforcing Material Content (wt %) | 20.0 | 30.0 | 40.0 | 30.0 | 40.0 |
| Number-Average Fiber Length of Fiber Reinforcing Material (mm) | 5.2 | 3.5 | 2.8 | 6.8 | 7.8 |
| Average Aspect Ratio of Fiber Reinforcing Material | 520 | 350 | 280 | 680 | 780 |
| MFR (g/10 min) | 64 | 63 | 62 | 52 | 36 |

TABLE 16-continued

| | Examples | | | | |
|---|---|---|---|---|---|
| | 36 DB36 | 37 DB37 | 38 DB38 | 39 DB39 | 40 DB40 |
| Draw-Down Resistance/Extrusion Stability | ○ | ○ | ○ | ○ | ○ |

(Production of Blow-Molded Articles)

Subsequently, the obtained dry-blended substances (DBs 36 to 40) were each supplied to a blow molding machine equipped with a ϕ45 mm-extruder (a full-flight-type single screw having a compression ratio of 1, and an effective length L/D ratio of 30), and extruded at a resin composition discharge rate of 25 kg/hr, a screw rotation speed of 250 rpm, and a cylinder setting temperature of 290° C. to form a parison having an outer diameter of 30 mm and a thickness of 4 mm. After that, air was blown into the parison within the mold, to thereby form a cylindrical container having a height of 250 mm, an outer diameter of 50 mm, and a thickness of approximately 2 to 3 mm.

The obtained blow-molded hollow articles were subjected to measurements (Table 17).

TABLE 17

| | Examples | | | | |
|---|---|---|---|---|---|
| | 36 DB36 | 37 DB37 | 38 DB38 | 39 DB39 | 40 DB40 |
| Evaluations for Blow-Molded Hollow Articles | | | | | |
| Number-Average Fiber Length of Fiber Reinforcing Material (mm) | 5.2 | 3.5 | 2.8 | 6.8 | 7.8 |
| Inner-Surface Smoothness | ⊙ | ⊙ | ⊙ | ⊙ | ⊙ |
| Thickness Uniformity | ⊙ | ⊙ | ⊙ | ⊙ | ⊙ |
| Heat Resistance | ⊙ | ⊙ | ⊙ | ⊙ | ⊙ |
| Impact Resistance (kJ/m$^2$) | 35 | 36 | 37 | 50 | 72 |

Examples 41 to 45

(Preparation of Dry-Blended Substances)

As described in Table 18, the long fiber-reinforced polyarylene sulfide resin composition pellets (CPs 1 to 3) and the polyolefin- and short fiber reinforcing material-containing polyarylene sulfide resin compositions (CPs 15 to 17) were put into a "MAZEMAZE MAN HBT-500" manufactured by MISUGI LTD. and dry-blended to obtain dry-blended substances (DBs 41 to 45).

A portion of such an obtained dry-blended substance was sampled and subjected to measurements (Table 18).

TABLE 18

| | Examples | | | | |
|---|---|---|---|---|---|
| | 41 DB41 | 42 DB42 | 43 DB43 | 44 DB44 | 45 DB45 |
| CP1 | 50.0 | 50.0 | 50.0 | | |
| CP2 | | | | 50.0 | |
| CP3 | | | | | 50.0 |
| CP15 | 50.0 | | | 50.0 | 50.0 |
| CP16 | | 50.0 | | | |
| CP17 | | | 50.0 | | |

TABLE 18-continued

|  | Examples | | | | |
| --- | --- | --- | --- | --- | --- |
|  | 41 DB41 | 42 DB42 | 43 DB43 | 44 DB44 | 45 DB45 |
| Evaluations for Dry-Blended Substances | | | | | |
| Fiber Reinforcing Material Content (wt %) | 20.0 | 30.0 | 40.0 | 30.0 | 40.0 |
| Number-Average Fiber Length of Fiber Reinforcing Material (mm) | 5.2 | 3.5 | 2.8 | 6.8 | 7.8 |
| Average Aspect Ratio of Fiber Reinforcing Material | 520 | 350 | 280 | 680 | 780 |
| MFR (g/10 min) | 64 | 63 | 62 | 52 | 36 |
| Draw-Down Resistance/Extrusion Stability | ○ | ○ | ○ | ○ | ○ |

(Production of Blow-Molded Articles)

Subsequently, the obtained dry-blended substances (DBs 41 to 45) were each supplied to a blow molding machine equipped with a ϕ45 mm-extruder (a full-flight-type single screw having a compression ratio of 1, and an effective length L/D ratio of 30), and extruded at a resin composition discharge rate of 25 kg/hr, a screw rotation speed of 250 rpm, and a cylinder setting temperature of 290° C. to form a parison having an outer diameter of 30 mm and a thickness of 4 mm. After that, air was blown into the parison within the mold, to thereby form a cylindrical container having a height of 250 mm, an outer diameter of 50 mm, and a thickness of approximately 2 to 3 mm.

The obtained blow-molded hollow articles were subjected to measurements (Table 19).

TABLE 19

|  | Examples | | | | |
| --- | --- | --- | --- | --- | --- |
|  | 41 DB41 | 42 DB42 | 43 DB43 | 44 DB44 | 45 DB45 |
| Evaluations for Blow-Molded Hollow Articles | | | | | |
| Number-Average Fiber Length of Fiber Reinforcing Material (mm) | 5.2 | 3.5 | 6.8 | 7.8 | 10.0 |
| Inner-Surface Smoothness | ⊙ | ⊙ | ⊙ | ⊙ | ⊙ |
| Thickness Uniformity | ⊙ | ⊙ | ⊙ | ⊙ | ⊙ |
| Heat Resistance | ⊙ | ⊙ | ⊙ | ⊙ | ⊙ |
| Impact Resistance (kJ/m²) | 35 | 36 | 37 | 50 | 72 |

Comparative Examples 1 to 6

(Preparation of Dry-Blended Substances)

As described in Table 20, the polyarylene sulfide resins (1 to 3) and the polyolefin- and short fiber reinforcing material-containing polyarylene sulfide resin compositions (CPs 15 to 17) were put into a "MAZEMAZE MAN HBT-500" manufactured by MISUGI LTD. and dry-blended to obtain dry-blended substances (DBs 46 to 51).

A portion of such an obtained dry-blended substance was sampled and subjected to measurements (Table 20).

TABLE 20

|  | Comparative Examples | | | | | |
| --- | --- | --- | --- | --- | --- | --- |
|  | 1 DB46 | 2 DB47 | 3 DB48 | 4 DB49 | 5 DB50 | 6 DB51 |
| PPS (1) | 75.0 | 50.0 | 75.0 | 50.0 | | |
| CP12 | 25.0 | | | | 50.0 | |
| CP13 | | 50.0 | | | | 50.0 |
| CP15 | | | 25.0 | | 50.0 | |
| CP17 | | | | 50.0 | | 50.0 |
| Evaluations for Dry-Blended Substances | | | | | | |
| Fiber Reinforcing Material Content (wt %) | 5 | 30 | 5 | 30 | 20 | 40 |
| Number-Average Fiber Length of Fiber Reinforcing Material (mm) | 0.3 | 0.3 | 0.3 | 0.3 | 0.3 | 0.3 |
| Aspect Ratio of Fiber Reinforcing Material | 30 | 30 | 30 | 30 | 30 | 30 |
| MFR (g/10 min) | 900 | 580 | 750 | 300 | 550 | 220 |
| Draw-Down Resistance/Extrusion Stability | X | X | X | X | X | X |

(Production of Blow-Molded Articles)

Subsequently, the obtained dry-blended substances (DBs 46 to 51) were each supplied to a blow molding machine equipped with a ϕ45 mm-extruder (a full-flight-type single screw having a compression ratio of 1, and an effective length L/D ratio of 30), and extruded at a resin composition discharge rate of 25 kg/hr, a screw rotation speed of 250 rpm, and a cylinder setting temperature of 290° C. to form a parison having an outer diameter of 30 mm and a thickness of 4 mm. After that, air was blown into the parison within the mold, to thereby form a cylindrical container having a height of 250 mm, an outer diameter of 50 mm, and a thickness of approximately 2 to 3 mm.

The obtained blow-molded hollow articles were subjected to measurements (Table 21).

TABLE 21

|  | Comparative Examples | | | | | |
| --- | --- | --- | --- | --- | --- | --- |
|  | 1 DB46 | 2 DB47 | 3 DB48 | 4 DB49 | 5 DB50 | 6 DB51 |
| Evaluations for Blow-Molded Hollow Articles | | | | | | |
| Number-Average Fiber Length of Fiber Reinforcing Material (mm) | 0.3 | 0.3 | 0.3 | 0.3 | 0.3 | 0.3 |
| Inner-Surface Smoothness | ○ | ○ | ○ | ⊙ | ⊙ | ⊙ |
| Thickness Uniformity | ○ | ○ | ○ | ⊙ | ⊙ | ⊙ |
| Heat Resistance | ⊙ | ⊙ | ⊙ | ⊙ | ⊙ | ⊙ |
| Impact Resistance (kJ/m²) | 25 | 35 | 33 | 39 | 38 | 43 |

Several tests were performed as follows.

[Melt Viscosity (MFR)/Draw-Down Resistance/Extrusion Stability]

The dry-blended substances obtained in Examples 1 to 45 and Comparative Examples 1 to 6 were put into a melt indexer (cylinder temperature: 316° C., orifice diameter: 3 mm), and, after preheating for 5 minutes, a melt flow rate (MFR) was measured under application of a load of 10 kg.

The obtained melt viscosity was used as an index of draw-down resistance and extrusion stability during blow molding; substances having a melt viscosity of 100 to 10 g/10 min were evaluated as "○" (good draw-down resistance and good extrusion stability), substances having a melt viscosity of less than 10 g/10 min were evaluated as "Δ" (poor extrusion stability), and substances having a melt viscosity of more than 100 g/10 min were evaluated as "x" (poor draw-down resistance).

[Inner-Surface Smoothness]

An inner-surface maximum height Ry for 5 arbitrary points in each of an upper portion (30 mm from the upper end) and a lower portion (30 mm from the lower end) of the body of each of the blow molded articles obtained in Examples 1 to 45 and Comparative Examples 1 to 6 was evaluated on the basis of the following criteria:

articles in which the maximum heights Ry were 0.2 mm or less were evaluated as "⊙", articles in which the maximum heights Ry were more than 0.2 mm and 0.5 mm or less were evaluated as "○", articles in which the maximum heights Ry were more than 0.5 mm and 1.0 mm or less were evaluated as "Δ", and articles in which the maximum heights Ry were more than 1.0 mm were evaluated as "x".

[Uniformity]

Thicknesses at 5 arbitrary points in each of an upper portion (30 mm from the upper end) and a lower portion (30 mm from the lower end) of the body of each of the blow molded articles obtained in Examples 1 to 45 and Comparative Examples 1 to 6 were measured, and the uniformity thereof was evaluated on the basis of the following criteria:

articles in which the difference between the average thickness of the upper portion and the average thickness of the lower portion was within 0.2 mm were evaluated as "⊙", articles in which the above difference in thickness was more than 0.2 mm and 0.5 mm or less were evaluated as "○", articles in which the above difference in thickness was more than 0.5 mm and 1.0 mm or less were evaluated as "Δ", and articles in which the above difference in thickness was more than 1.0 mm were evaluated as "x".

[Heat Resistance]

The dry-blended substances obtained in Examples 1 to 45 and Comparative Examples 1 to 6 were supplied to an injection molding machine equipped with a φ45 mm-extruder (a full-flight-type single screw having a compression ratio of 1, and an effective length L/D ratio of 20), and injection-molded at a cylinder temperature of 300° C. and a mold temperature of 140° C. to form a dumbbell-shaped test piece for a tensile test. This test piece was heated for 3,000 hours in an oven at 260° C., taken out, and then measured for the tensile strength; and a decrease from the tensile strength of the test piece which was not heated was represented as a retention ratio (%). Test pieces having a retention ratio of 80% or higher were evaluated as "⊙", test pieces having a retention ratio of 60% or higher and less than 80% were evaluated as "○", test pieces having a retention ratio of 40% or higher and less than 60% were evaluated as "Δ", and test pieces having a retention ratio of less than 40% were evaluated as "x".

[Impact Resistance]

A central portion of the dumbbell-shaped test piece for a tensile test prepared in the heat resistance test was cut into a rod shape having a length of 80 mm, a width of 10 mm, and a thickness of 4 mm to serve as an impact resistance test piece. A Charpy impact test was performed in accordance with ISO 179 to measure the impact strength (kJ/mm$^2$).

[Measurements of Fibers of Fiber Reinforcing Materials in Pellets or Molded Articles]

The dry-blended substances or blow-molded hollow articles obtained in Examples 1 to 45 and Comparative Examples 1 to 6 were exposed for 2 h at 550° C. in a muffle furnace; 500 glass fibers contained in the ash were randomly picked, and measured for fiber length and fiber diameter using a digital microscope; and a number-average fiber length and a number-average fiber diameter were calculated. From the values of the number-average fiber length and the number-average fiber diameter obtained, a number-average fiber length/number-average fiber diameter was calculated as an aspect ratio.

Incidentally, the components described in Tables are as follows and the values for the components are based on parts by mass.

The raw materials in Tables are as follows.

PPS (1); polyphenylene sulfide resin "DIC.PPS" manufactured by DIC Corporation (V6 melt viscosity: 30 Pa·s, non-NT index: 1.2)

PPS (2); polyphenylene sulfide resin "DIC.PPS" manufactured by DIC Corporation (V6 melt viscosity: 50 Pa·s, non-NT index: 1.2)

PPS (3); polyphenylene sulfide resin "DIC.PPS" manufactured by DIC Corporation (V6 melt viscosity: 150 Pa·s, non-NT index: 1.2)

The V6 melt viscosity of such a PPS resin is a value measured using a flow tester CFT-500C manufactured by Shimadzu Corporation after holding for 6 minutes at 300° C. with a load of $1.96 \times 10^6$ Pa and L/D=10/1.

Fiber Reinforcing Material (1); Glass fiber roving (E-glass, fiber diameter: 10 μm, epoxy-based sizing agent)

Fiber Reinforcing Material (2); Glass fiber chopped strand (E-glass, fiber diameter: 10 μm, fiber length: 3 mm, epoxy-based sizing agent)

Polyolefin (1): Ethylene-glycidyl methacrylate-methyl acrylate copolymer "Bondfast-7L" manufactured by Sumitomo Chemical Company, Limited Polyolefin (2): Ethylene-maleic anhydride-ethyl acrylate copolymer "BONDINE AX8390" manufactured by Arkema Polyolefin (3): Ethylene-1-octene copolymer "ENGAGE 8842" manufactured by The Dow Chemical Company

The invention claimed is:

1. A method for producing a long fiber-reinforced polyarylene sulfide resin molded article, the method being a method for producing a blow-molded hollow article containing a polyarylene sulfide resin and a fiber reinforcing material having a fiber length of more than 5 mm, the method comprising subjecting a long fiber-reinforced polyarylene sulfide resin composition containing a polyarylene sulfide resin (a1) and a fiber reinforcing material having a fiber length of more than 5 mm and a polyarylene sulfide resin (a2) to dry blending, subsequently to heating at a temperature not lower than a melting point of the polyarylene sulfide resins to melt the polyarylene sulfide resins, and subsequently to molding.

2. The method for producing a long fiber-reinforced polyarylene sulfide resin molded article according to claim 1, wherein a proportion of the long fiber-reinforced polyarylene sulfide resin composition is 98 to 2 parts by mass and a proportion of the polyarylene sulfide resin (a2) is 2 to 98 parts by mass, with respect to the total 100 parts by mass of the long fiber-reinforced polyarylene sulfide resin composition and the polyarylene sulfide resin (a2).

3. The method for producing a long fiber-reinforced polyarylene sulfide resin molded article according to claim 1, wherein, in the long fiber-reinforced polyarylene sulfide resin composition, a proportion of the polyarylene sulfide resin (a1) is 99 to 20 parts by mass and a proportion of the fiber reinforcing material is 1 to 80 parts by mass, with respect to the total 100 parts by mass of the polyarylene sulfide resin (a1) and the fiber reinforcing material.

4. The method for producing a long fiber-reinforced polyarylene sulfide resin molded article according to claim 1, wherein the long fiber-reinforced polyarylene sulfide resin composition is obtained by coating or impregnating a continuous fiber with the polyarylene sulfide resin (a1) that is melted and kneaded, subsequently cooling the continuous fiber to obtain a strand, and cutting the strand to a length of more than 5 mm.

5. The method for producing a long fiber-reinforced polyarylene sulfide resin molded article according to claim 1, wherein the fiber reinforcing material has a fiber diameter of 5 to 50 μm.

6. The method for producing a long fiber-reinforced polyarylene sulfide resin molded article according to claim 1, wherein the fiber reinforcing material has an aspect ratio of 250 to 5000.

7. The method for producing a long fiber-reinforced polyarylene sulfide resin molded article according to claim 1, wherein the fiber reinforcing material is at least one selected from the group consisting of a glass fiber reinforcing material, a carbon fiber reinforcing material, a basalt fiber reinforcing material, and an aramid fiber reinforcing material.

8. The method for producing a long fiber-reinforced polyarylene sulfide resin molded article according to claim 1, wherein the polyarylene sulfide resins have a non-Newtonian index of 0.9 to 1.2, and a melt viscosity at 300° C. of 10 to 500 [Pa·s].

9. The method for producing a long fiber-reinforced polyarylene sulfide resin molded article according to claim 1, wherein the molding is blow hollow molding, and the long fiber-reinforced polyarylene sulfide resin molded article is a blow-molded hollow article.

10. The method for producing a long fiber-reinforced polyarylene sulfide resin molded article according to claim 1, wherein the long fiber-reinforced polyarylene sulfide resin composition contains, in addition to the polyarylene sulfide resin and the fiber reinforcing material having a fiber length of more than 5 mm, further a thermoplastic elastomer (b1) optionally having at least one functional group selected from the group consisting of an epoxy group, an amino group, a carboxy group, an isocyanato group, and moieties represented by a structural formula (1) below or a structural formula (2) below

[Chem. 1]

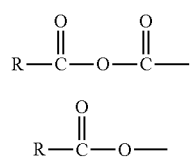

Structural formula (1)

Structural formula (2)

(where, in the structural formula (1) and the structural formula (2), R's represent an alkyl group having 1 to 8 carbon atoms).

11. The method for producing a long fiber-reinforced polyarylene sulfide resin molded article according to claim 10, wherein, in the long fiber-reinforced polyarylene sulfide resin composition, a proportion of the polyarylene sulfide resin (a1) is 98 to 19 parts by mass, a proportion of the fiber reinforcing material is 1 to 79 parts by mass, and a proportion of the thermoplastic elastomer (b1) is 1 to 30 parts by mass, with respect to the total 100 parts by mass of the polyarylene sulfide resin (a1), the fiber reinforcing material, and the thermoplastic elastomer (b1).

12. The method for producing a long fiber-reinforced polyarylene sulfide resin molded article according to claim 10, wherein the long fiber-reinforced polyarylene sulfide resin composition is obtained by coating or impregnating a continuous fiber with a composition containing the polyarylene sulfide resin (a1) that is melted and kneaded and the thermoplastic elastomer (b1), subsequently cooling the continuous fiber to obtain a strand, and cutting the strand to a length of more than 5 mm.

13. The method for producing a long fiber-reinforced polyarylene sulfide resin molded article according to claim 1, wherein the long fiber-reinforced polyarylene sulfide resin composition is dry-blended with the polyarylene sulfide resin (a2) and further a thermoplastic elastomer (b2) optionally having at least one functional group selected from the group consisting of an epoxy group, an amino group, a carboxy group, an isocyanato group, and moieties represented by a structural formula (1) below or a structural formula (2) below

[Chem. 2]

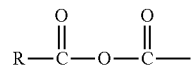

Structural formula (1)

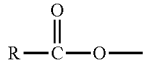

Structural formula (2)

(where, in the structural formula (1) and the structural formula (2), R's represent an alkyl group having 1 to 8 carbon atoms).

14. The method for producing a long fiber-reinforced polyarylene sulfide resin molded article according to claim 13, wherein a proportion of the long fiber-reinforced polyarylene sulfide resin composition is 98 to 2 parts by mass, and a total proportion of the polyarylene sulfide resin (a2) and the thermoplastic elastomer (b2) is 2 to 98 parts by mass, with respect to the total 100 parts by mass of the long fiber-reinforced polyarylene sulfide resin composition, the polyarylene sulfide resin (a2), and the thermoplastic elastomer (b2).

15. The method for producing a long fiber-reinforced polyarylene sulfide resin molded article according to claim 13, wherein a proportion of the polyarylene sulfide resin (a2) is 99.9 to 50 parts by mass and a proportion of the thermoplastic elastomer (b2) is 0.1 to 50 parts by mass, with respect to the total 100 parts by mass of the polyarylene sulfide resin (a2) and the thermoplastic elastomer (b2).

16. The method for producing a long fiber-reinforced polyarylene sulfide resin molded article according to claim 1, wherein the long fiber-reinforced polyarylene sulfide resin composition is provided as a pellet, and the fiber reinforcing material has a length not less than a length of the pellet.

* * * * *